US010658915B2

(12) United States Patent
Hull

(10) Patent No.: US 10,658,915 B2
(45) Date of Patent: May 19, 2020

(54) ROTATING MACHINE HAVING MAGNETICALLY ACTUATED PISTONS

(71) Applicant: The Boeing Company, Chicago, IL (US)

(72) Inventor: John R. Hull, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 336 days.

(21) Appl. No.: 15/617,335

(22) Filed: Jun. 8, 2017

(65) Prior Publication Data

US 2018/0358881 A1    Dec. 13, 2018

(51) Int. Cl.

| | |
|---|---|
| H02K 35/02 | (2006.01) |
| F25B 9/14 | (2006.01) |
| F01B 1/06 | (2006.01) |
| H02K 7/06 | (2006.01) |
| H02K 49/10 | (2006.01) |
| F01B 9/04 | (2006.01) |
| F02G 1/044 | (2006.01) |
| F02G 1/057 | (2006.01) |
| H02K 1/17 | (2006.01) |
| H02K 1/34 | (2006.01) |
| H02K 7/08 | (2006.01) |
| H02K 16/00 | (2006.01) |
| H02K 33/00 | (2006.01) |

(52) U.S. Cl.
CPC .............. *H02K 35/02* (2013.01); *F01B 1/06* (2013.01); *F01B 1/0634* (2013.01); *F01B 9/04* (2013.01); *F02G 1/044* (2013.01); *F02G 1/057* (2013.01); *F25B 9/14* (2013.01); *H02K 1/17* (2013.01); *H02K 1/34* (2013.01); *H02K 7/06* (2013.01); *H02K 7/08* (2013.01); *H02K 49/108* (2013.01); *F02G 2243/00* (2013.01); *F02G 2257/02* (2013.01); *F25B 2309/003* (2013.01); *H02K 16/00* (2013.01); *H02K 33/00* (2013.01)

(58) Field of Classification Search
CPC ............ H02K 35/02; H02K 1/17; H02K 1/34; H02K 7/06; H02K 7/08; H02K 49/108; F01B 1/06; F01B 1/0634; F01B 9/04; F02G 1/044; F02G 1/057; F25B 9/14
See application file for complete search history.

(56) References Cited

U.S. PATENT DOCUMENTS

2007/0210659 A1    9/2007 Long

FOREIGN PATENT DOCUMENTS

| DE | 3723948 A1 | 11/1988 |
|---|---|---|
| DE | 29614666 U1 | 2/1998 |
| DE | 102010023672 A1 | 12/2011 |

OTHER PUBLICATIONS

Machine translation of Dahlhoff [DE 102010023672] (Year: 2011).*
EP, Search Report; EP Patent Application 18167855.8, 8 pages (dated Oct. 9, 2018).

* cited by examiner

*Primary Examiner* — Bernard Rojas
(74) *Attorney, Agent, or Firm* — Vivacqua Law, PLLC

(57) ABSTRACT

A rotating machine is disclosed and includes a stator defining a circumference, a plurality of first magnet arrays, a rotor, and a first piston. The first magnet arrays are comprised of a plurality of discrete magnets arranged around the circumference of the stator in a first magnetic pattern. The rotor is rotatable about an axis of rotation and defines a main body. The main body defines a first passageway. The first piston includes a plurality of first magnetic elements and is actuated within the first passageway of the rotor. The plurality of discrete magnets are arranged in the first magnetic pattern and are positioned to interact with the magnetic elements of the first piston to create a first magnetic force as the rotor rotates about the axis of rotation. The first magnetic force represents a first amount of force required to actuate the first piston.

20 Claims, 15 Drawing Sheets

ROTATING MACHINE HAVING MAGNETICALLY ACTUATED PISTONS

FIELD

The disclosed system relates to a rotating machine and, more particularly, to a rotating machine including pistons having magnetic elements, where the pistons are actuated by a magnetic force that is created as the rotor rotates.

BACKGROUND

Heat engines use energy provided in the form of heat to do work. There are several thermodynamic cycles that may be employed by heat engines such as, for example, the Carnot cycle, the Stirling cycle, and various internal combustion engine cycles like the Otto cycle and the diesel cycle. All of these thermodynamic heat engines use a gas as the working fluid. For example, the Stirling cycle is often used in relatively small and modest sized cryocoolers, where the working fluid is usually helium.

Stirling engines may include internal pistons that are used for displacing and compressing the working fluid and to generate output power. Specifically, the pistons receive work during their up-stroke or compression, and generate work during their down-stroke or expansion, followed by a transfer of heat at a given temperature by the working fluid to a surrounding heat sink. The pistons of the Stirling engine may be actuated by suspending the pistons using flexure bearings, and then creating the driving motion using electromagnets. However, the electromagnets create a driving force that is predominantly sinusoidal in time. The sinusoidal driving force is caused by the inductance of the electromagnet's coils as well as because the drive voltage and the switching speeds are both kept relatively low.

Rotating machinery also includes a stator and a rotor. In at least some applications, the rotor may need to be cooled. In order to cool a rotor, cooled gas from a reservoir or refrigerator may be introduced in a space between the rotor and a stationary component such as the stator. However, the rotor is cooled unevenly since the outermost surface of the rotor experiences a majority of the cooled gas. Therefore, in order to cool the interior of the rotor, special rotating joints for passage of the cooling gas may be required. Furthermore, if a refrigerator is used to store the cooled gas, then electrical power connections are required.

Electrical power is produced on a rotor by contacting the rotor with brushes that carry electrical current. Electrical current generated on a component that is not the rotor may flow through the brushes and along electrical conductors upon the rotor, where the electrical current is then utilized. However, the passage of the electric current through the electrical conductors produces heat, which in turn creates Joule heating losses. Furthermore, the brushes may contact a shaft of the engine, which results in wear and maintenance issues. The wear created by the brushes increases with rotational speed. In another approach to provide power to the rotor, a battery may be used instead of brushes. However, batteries only store a limited amount of energy and eventually need to be recharged or replaced. Finally, in yet another approach electrical power for the rotor is produced by induction transfer from coils located on the stator to coils located on the rotor. However, Joule heating losses occur in the coils on both the rotor and the stator.

SUMMARY

In one aspect, a rotating machine is disclosed and includes a stator defining a circumference, a plurality of first magnet arrays, a rotor, and a first piston. The first magnet arrays are comprised of a plurality of first discrete magnets arranged around the circumference of the stator in a first magnetic pattern. The rotor is rotatable about an axis of rotation and defines a main body. The main body defines a first passageway. The first piston includes a plurality of first magnetic elements and is actuated within the first passageway of the rotor. The plurality of first discrete magnets are arranged in the first magnetic pattern and are positioned to interact with the magnetic elements of the first piston to create a first magnetic force as the rotor rotates about the axis of rotation. The first magnetic force represents a first amount of force required to actuate the first piston within the first passageway of the rotor.

In another aspect, a method of actuating a piston within a passageway of a rotor, where the rotor is part of a rotating machine, is disclosed. The method comprises rotating the rotor about an axis of rotation. The rotor is surrounded by a stator that defines a circumference, and a plurality of magnet arrays are comprised of a plurality of discrete magnets arranged around the circumference of the stator in a first magnetic pattern. The method further includes creating a first magnetic force as the rotor rotates about the axis of rotation. The first magnetic force is created by an interaction between the plurality of discrete magnets of the stator and a plurality of magnetic elements of the first piston. The first magnetic force represents an amount of force required to actuate the first piston within the first passageway of the rotor. Finally, the method includes actuating the first piston within the first passageway of the rotor.

Other objects and advantages of the disclosed method and system will be apparent from the following description, the accompanying drawings and the appended claims.

DETAILED DESCRIPTION

Figure 1:
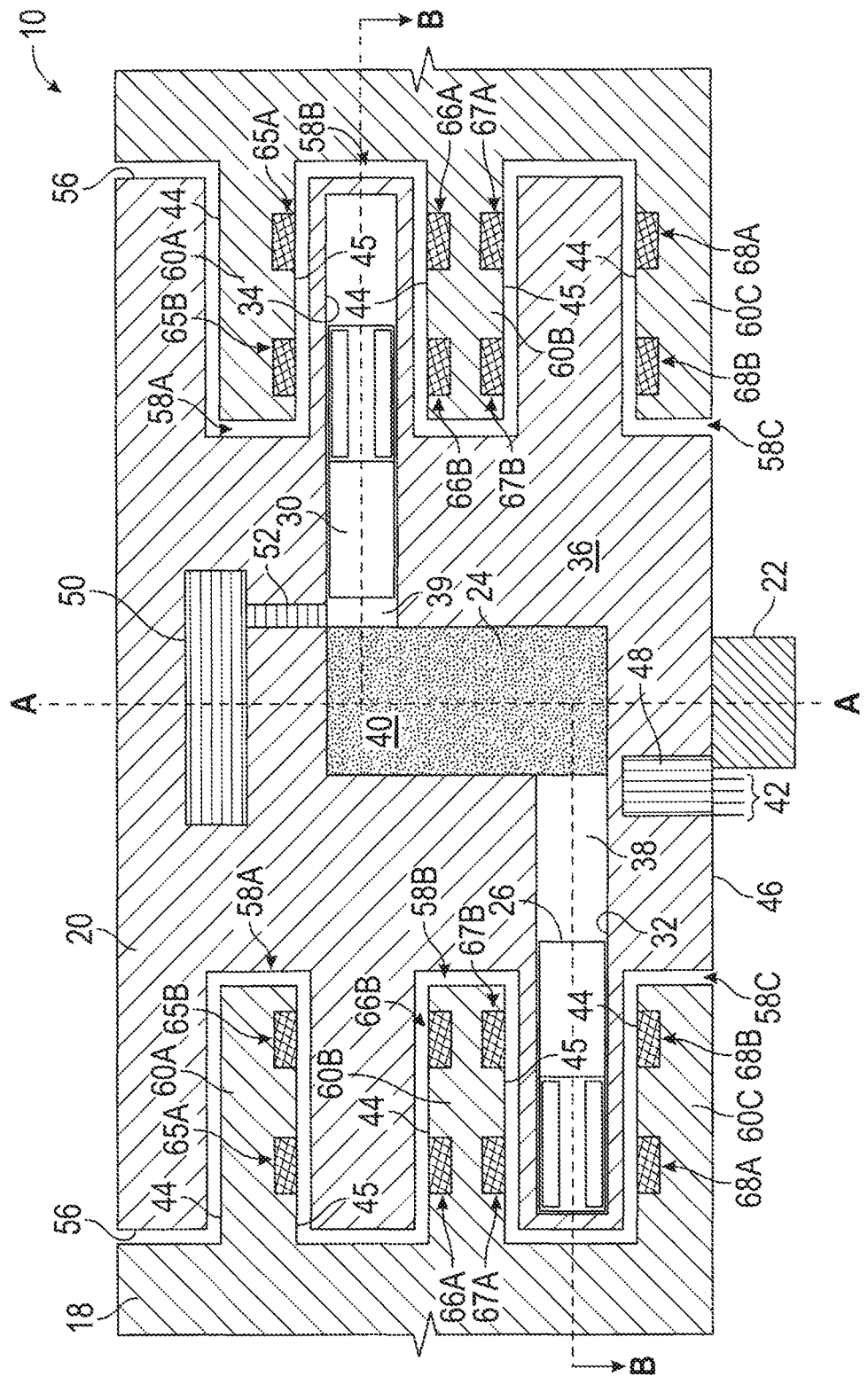
FIG. 1 is a schematic, cross-sectioned view of an exemplary rotating machine illustrated as a cryocooler including a stator, a rotor that rotates about an axis of rotation, a compression piston, and an expansion piston.

FIG. 1 is a schematic, transverse cross-sectioned view of a rotating machine in the form of a heat engine 10. The heat engine 10 includes a stator 18, a rotor 20 connected to a shaft 22, a regenerator 24, a first piston 26, and a second piston 30. The first piston 26 is a compression piston that is actuated within a first compression passageway 32. The second piston 30 is an expansion piston that is actuated within a second expansion passageway 34. The rotor 20 is rotatable about an axis of rotation A-A and defines a main body 36. The main body 36 of the rotor 20 defines both the compression passageway 32 and the expansion passageway 34. As seen in FIG. 1, a warm compression space 38 is defined within the compression passageway 32 of the rotor 20, and is located between the compression piston 26 and the regenerator 24. Similarly, an expansion space 39 is defined within the expansion passageway 34 of the rotor 20, and is located between the expansion piston 30 and the regenerator 24.

Figure 3:
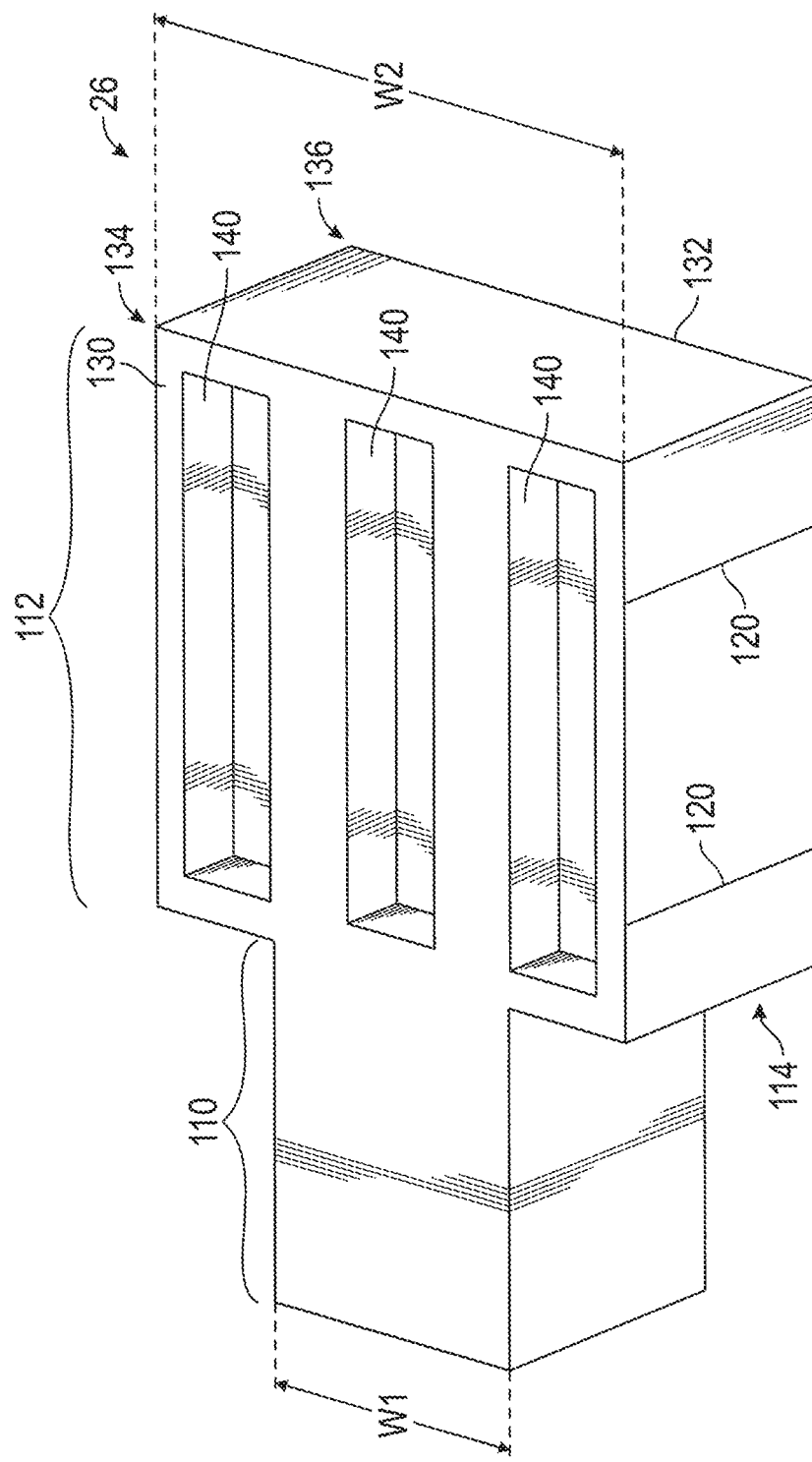
FIG. 3 is a perspective view of the compression piston shown in FIG. 1, where the compression piston includes a shoulder that is defined between a first section and a second section.
Figure 4:
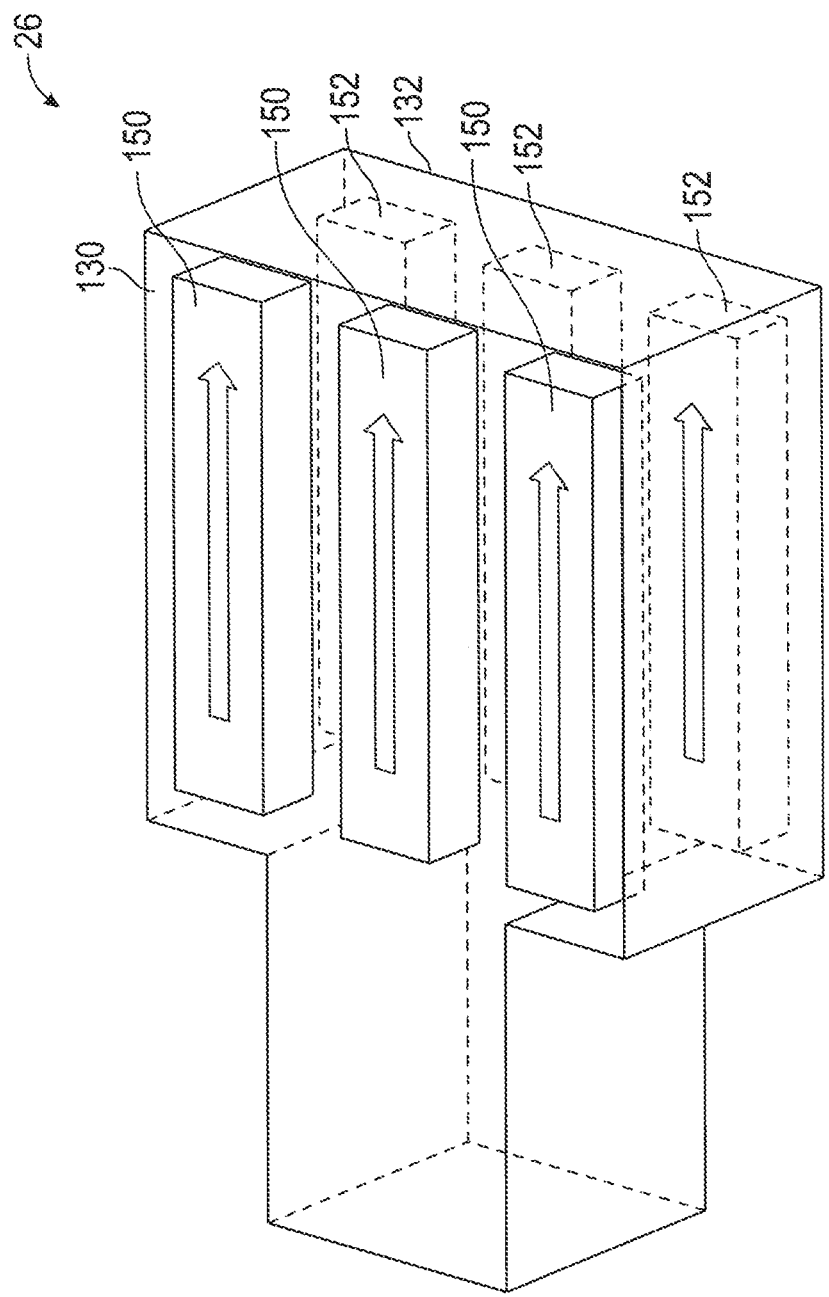
FIG. 4 is an illustration of the piston shown in FIG. 3, where the piston includes permanent magnets and is drawn as a transparent object.

The compression piston 26 and the compression passageway 32 define a piston-cylinder assembly, and the expansion piston 30 and the expansion passageway 34 also define another piston-cylinder assembly. Although the term piston-cylinder assembly is used, it is to be appreciated that the compression passageway 32 and the expansion passageway 34 are not limited to a cylinder-shaped configuration. Indeed, as explained in greater detail below, the pistons 26, 30 may include any number of shapes. For example, as seen in FIGS. 3 and 4, the compression piston 26 is illustrated having a stepped profile with flat side surfaces as well as flat upper and lower surfaces.

The regenerator 24 is positioned within the main body 36 of the rotor 20, between the compression space 38 and the expansion space 39. In the exemplary embodiment as shown, the regenerator 24 is aligned with the axis of rotation A-A of the rotor 20. The regenerator 24 is constructed of a porus solid matrix 40 through which a working fluid may flow cyclically back and forth. Specifically, energy is transferred from the working fluid into the matrix 40 of the regenerator 24 and is absorbed by the working fluid from the matrix 40 of the regenerator 24. The working fluid fills the pores of the matrix 40 of the regenerator 24, the warm compression space 38, and the cold expansion space 39. The working fluid is a pressurized gas or liquid used to actuate the compression piston 26 and the expansion piston 30. In the exemplary embodiment as shown, the heat engine 10 is a Stirling engine including four stages of operation, and the working fluid is helium. Although a Stirling engine is described, the heat engine 10 may be any other type of heat engine as well such as, but not limited to, an engine that operates based on the Carnot cycle, the Otto cycle, or the diesel cycle.

Figure 14:
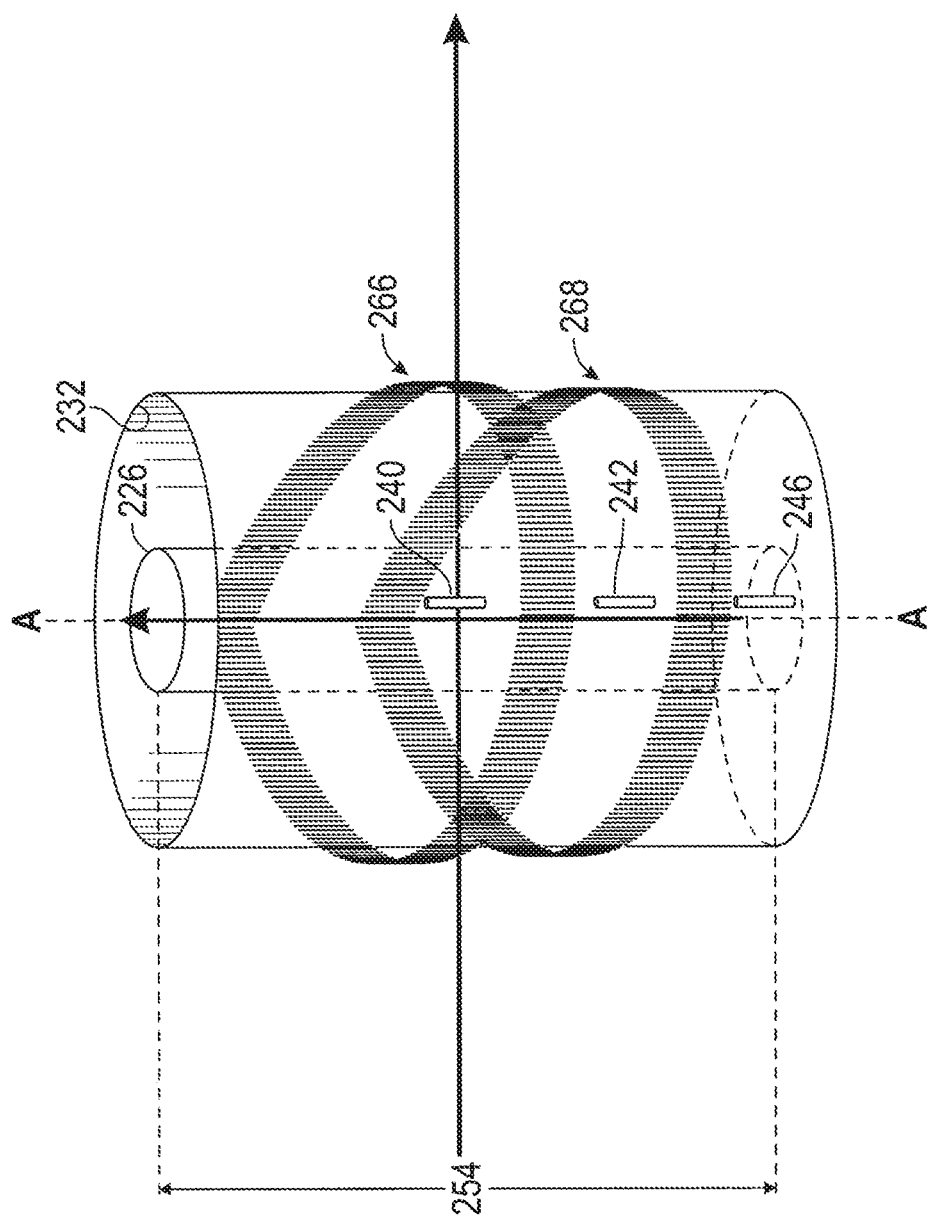
FIG. 14 is illustrates an alternative embodiment of the piston shown in FIG. 3, where the piston actuates in a direction that is substantially parallel with the axis of rotation of the rotor shown in FIG. 1.

In the exemplary embodiment as illustrated, both the compression piston 26 and the expansion piston 30 are oriented within their respective passageways 32, 34 in a direction that is substantially perpendicular to the axis of rotation A-A of the rotor 20. However, in the embodiment as shown in FIG. 14, the pistons 26, 30 are substantially parallel with respect to the axis of rotation A-A of the rotor 20.

A series of heat dissipation fins 42 may be disposed along an outermost bottom surface 46 defined by the rotor 20. The rotor 20 also contains a pathway of high thermal conductivity 48. The pathway of high thermal conductivity 48 creates a thermal connection between the warm compression space 38, the shaft 22, and the fins 42. In the exemplary embodiment as shown in FIG. 1, the heat engine 10 is a cryocooler employing a Stirling cycle. The cryocooler provides cooling to a load 50. The rotor 20 contains a pathway 52, which thermally connects the load 50 to the cold expansion space 39.

Figure 2:
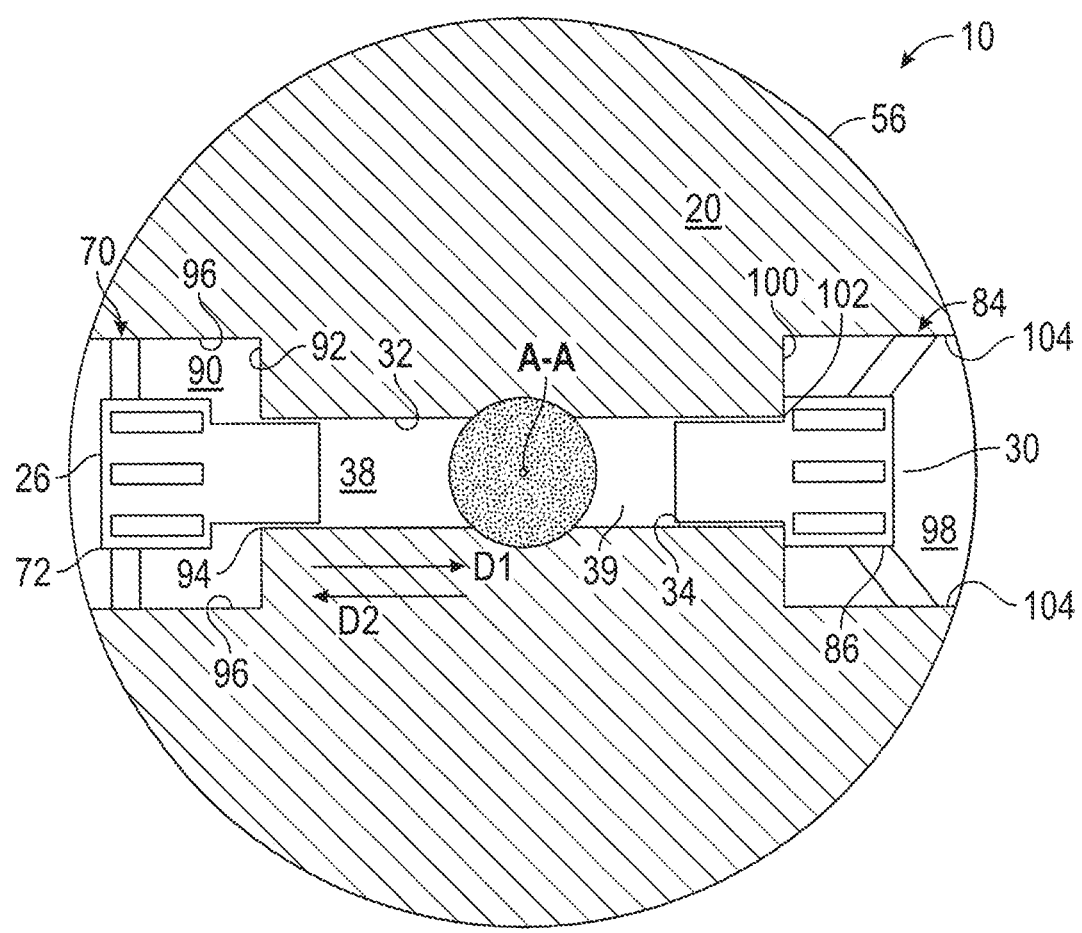
FIG. 2 is a cross-sectioned view of the heat engine shown in FIG. 1, viewed along section line B-B.

FIG. 2 is a cross-sectioned view of the rotor 20 of the heat engine 10 shown in FIG. 1, viewed along section line B-B. As seen in FIG. 2, the rotor 20 defines an outermost circumferential surface 56. Referring to both FIGS. 1 and 2, the surface 56 of the rotor 20 defines a plurality of cutouts or spaces 58A, 58B, 58C. The stator 18 surrounds the rotor 20. More specifically, the stator 18 surrounds the entire circumferential surface 56 of the rotor 20. The spaces 58A, 58B, 58C extend around the entire circumferential surface 56 of the rotor 20. As seen in FIG. 1, the spaces 58A, 58B, 58C are shaped to receive corresponding projections 60A, 60B, 60C that are defined by the stator 18. Specifically, space 58A is shaped to receive projection 60A, space 58B is shaped to receive projection 60B, and space 58C is shaped to receive projection 60C.

As seen in FIG. 1, the projections 60A, 60B, 60C of the stator 18 each include an array of permanent magnets 65A, 65B, 66A, 66B, 67A, 67B, 68A, 68B. Specifically, as illustrated in the exemplary embodiment as shown in FIG. 1, the magnet arrays 66A, 66B, 68A, and 68B are disposed along an upper surface 44 of a respective projection 60A, 60B, 60C of the stator 18, and the magnet arrays 65A, 65B, 67A, and 67B are disposed along a lower surface 45 of each projection 60A, 60B, 60C. However, as explained below, the magnets arrays 65A, 65B, 66A, 66B, 67A, 67B, 68A, 68B are not limited to being disposed along the upper or lower surfaces 44, 45 of the projections 60, and may also be placed proximate to the upper and lower surfaces 44, 45 as well.

Referring to FIG. 2, the compression piston 26 is coupled to the rotor 20 by a first bearing 70. Specifically, the first bearing 70 is connected to an end portion 72 of the compression piston 26, where the end portion 72 is the outermost portion of the compression piston 26 with respect to the axis of rotation A-A of the rotor 20. Similarly, the expansion piston 30 is coupled to the rotor 20 by a second bearing 84. Specifically, the second bearing 84 is connected to an end portion 86 of the expansion piston 30, where the end portion 86 is the outermost portion of the expansion piston 30 with respect to the axis of rotation A-A of the rotor 20.

In one exemplary embodiment, the first bearing 70 and the second bearing 84 are both flexure bearings. The first and second bearings 70, 84 are both part of the rotor 20, and include a relatively low stiffness in the direction of piston travel. However, the first and second bearings 70, 84 also include a relatively high stiffness in a direction substantially perpendicular to piston travel. Although flexure bearings are described, other types of bearings may be utilized as well such as, for example, gas bearings, slide bearings, or linear ball bearings.

A space 90 is defined by a surface 92 around an opening 94 of the compression passageway 32 and a pair of side surfaces 96 defined by the rotor 20. Similarly, a space 98 is defined by a surface 100 around an opening 102 of the expansion passageway 34 and a pair of side surfaces 104 of the rotor 20. Both spaces 90, 98 are filled with the working fluid at ambient temperature. In the exemplary embodiment as described, the rotor 20 is part of a Stirling engine and the working fluid is helium.

FIG. 3 is an exemplary illustration of the compression piston 26. Although the compression piston 26 is described in FIG. 3, the expansion piston 30 also includes the same components and structure. The compression piston 26 illustrated in FIG. 3 includes a first section 110 and a second section 112. The first section 110 defines a first width W1 that is less than a second width W2 defined by the second section 112 of the compression piston 26, and thereby defines shoulder 114. However, in another embodiment the first width W1 of the first section 110 of the compression piston 26 is greater than the second width W2 of the second section 112. In yet another embodiment, the compression piston 26 may not include a stepped configuration as seen in FIG. 3, and instead includes a uniform cross-section. Moreover, the compression piston 26 is not limited to the configuration as shown in FIG. 3, and may include any number of shapes such as, for example, a cylinder. The compression piston 26 also includes a pair of attachment points 120 located along opposing sides of the second section 112 of the compression piston 26 (only one pair of attachment points are visible in FIG. 3). Referring to both FIGS. 2 and 3, the attachment points 120 of the compression piston 26 are used to secure the compression piston 26 with a respective one of the bearings 70, 84.

Continuing to refer to both FIGS. 2 and 3, the first section 110 of the compression piston 26 is received by the warm compression space 38, and the second section 112 of the compression piston 26 is received by the space 90, which is at ambient temperature. The shoulder 114 of the compression piston 26 may abut against the surface 92 around the opening 94 of the warm compression space 38 when the compression piston 26 is in a position of full or maximum compression.

Referring now to FIG. 3, the compression piston 26 defines a first planar surface 130 and a second planar surface 132 that is substantially parallel to the first planar surface 130. The first planar surface 130 is disposed along an uppermost portion 134 of the compression piston 26, and the second planar surface 132 is disposed along a lowermost portion 136 of the compression piston 26. The first planar surface 130 defines a plurality of cavities 140 along the second width W2 of the compression piston 26. The cavities 140 each extend in a direction that is substantially parallel with respect to directions D1 and D2 (FIG. 2) of piston travel. Turning now to FIG. 2, the compression piston 26 translates in a first direction D1 towards the axis of rotation A-A and a second direction D2 away from the axis of rotation A-A.

Figure 13:
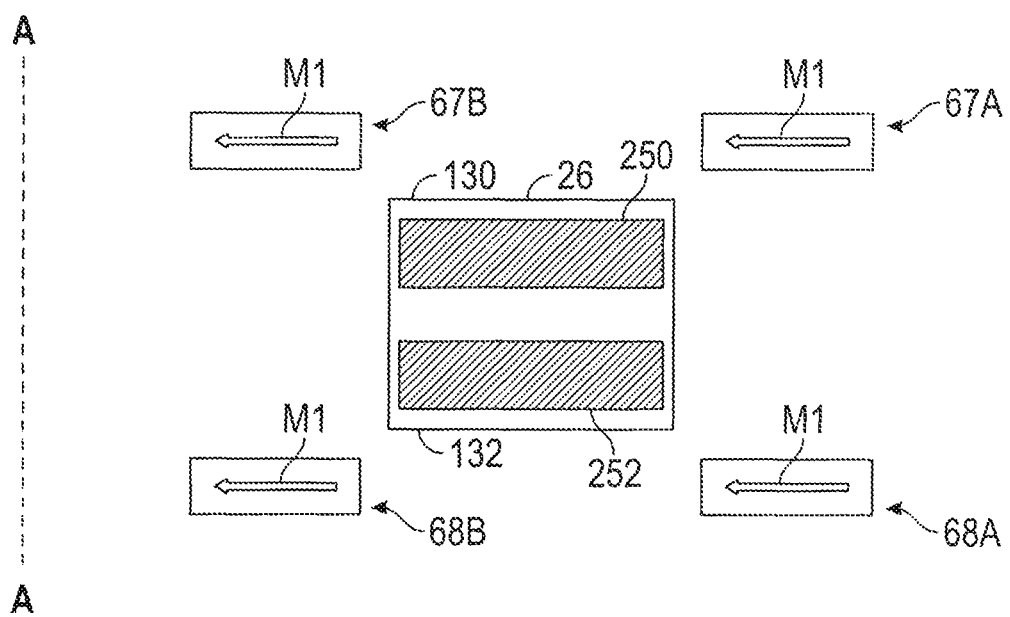
FIG. 13 is a schematic diagram illustrating yet another embodiment of the piston, where the piston includes ferromagnetic elements that interact with the magnet arrays of the stator.

FIG. 4 is an illustration of the compression piston 26, which is drawn as a transparent object in order to view the second planar surface 132. As seen in FIG. 4, a series of magnetic elements 150 are each received by one of the cavities 140 (FIG. 3) defined by the compression piston 26. In the embodiment as shown, the magnetic elements 150 are permanent magnets. However, in another embodiment as shown in FIG. 13 which is explained in detail below, the magnetic element 150 may be a ferromagnetic bar. In one optional embodiment, the second planar surface 132 of the compression piston 26 also defines a plurality of cavities that are each shaped to receive a corresponding permanent magnet 152. Referring to both FIGS. 2 and 4, each of the magnets 150, 152 include a direction of magnetization that is substantially parallel with respect to the first and second directions D1 and D2 of piston travel within the rotor 20.

FIGS. 5A-5D illustrate an exemplary schematic diagram of the compression piston 26 actuated into one of the four different states of the Stirling cycle within the compression passageway 32 of the rotor 20. The passageway 32 of the rotor 20 is surrounded by the projections 60A, 60B, 60C of the stator 18. As explained below, the compression piston 26 is actuated into one of the four different states of the Stirling cycle by a first magnetic force created between the magnet arrays 67A, 67B, 68A, 68B of the stator 18 and the permanent magnets 150, 152 of the compression piston 26. The four different states of the Stirling cycle are isothermal expansion, constant-volume heat removal, isothermal compression, and constant-volume heat addition, and each of the FIGS. 5A-5D illustrate the compression piston 26 at one of the four different states of the Sterling cycle.

Figure 5A:
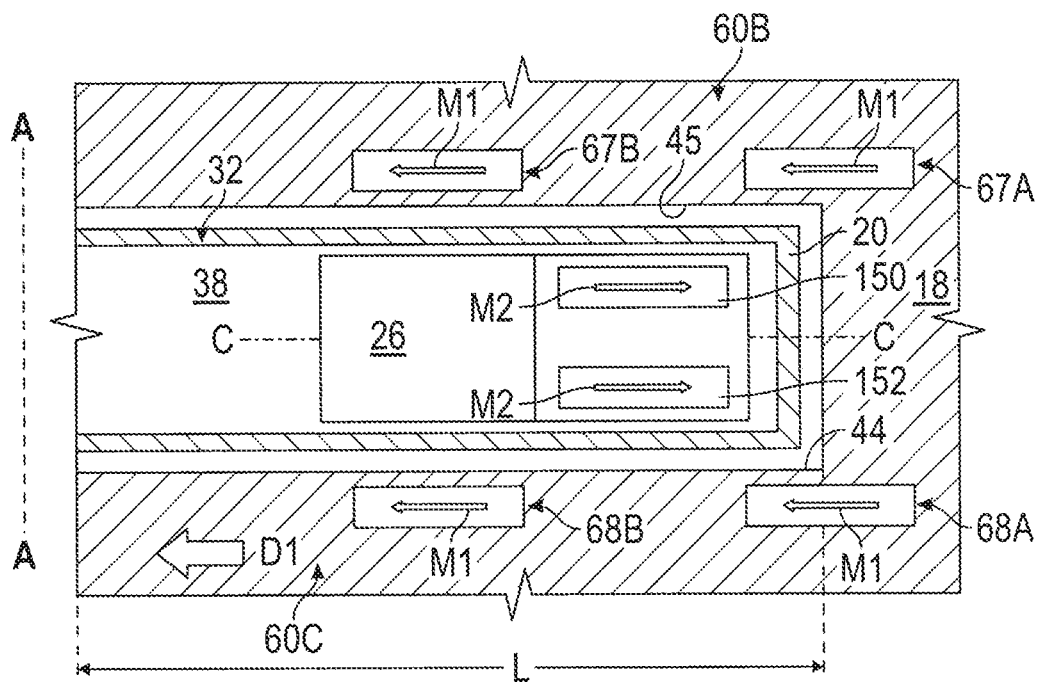
FIGS. 5A-5D illustrate the piston disposed within a passageway defined by the rotor shown in FIG. 1, where each of the FIGS. 5A-5D illustrate the piston at one of the four different states of a Stirling cycle.
Figure 5B:
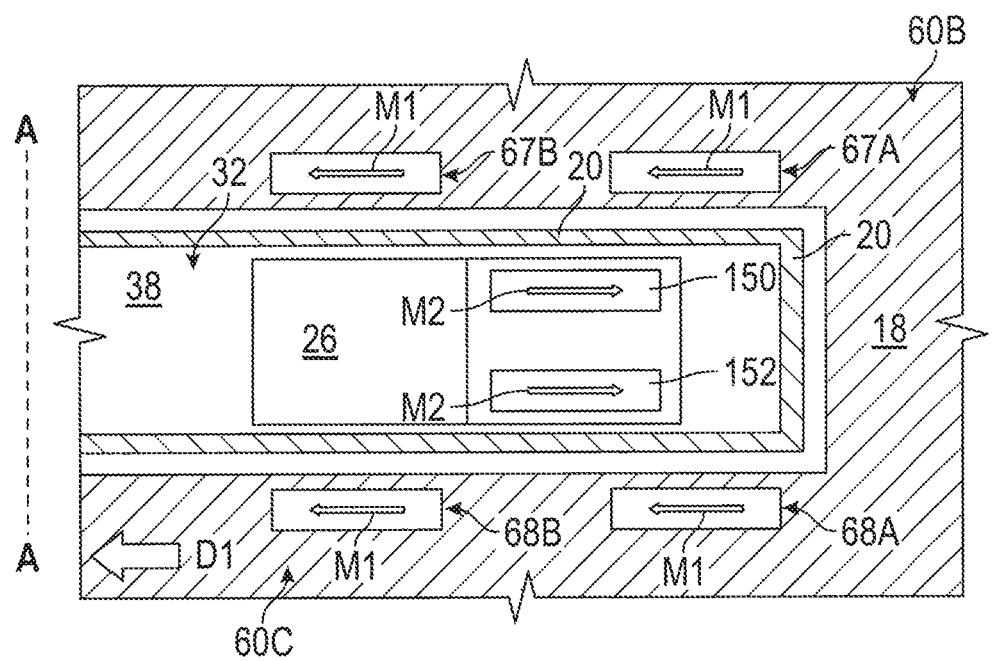
Figure 5C:
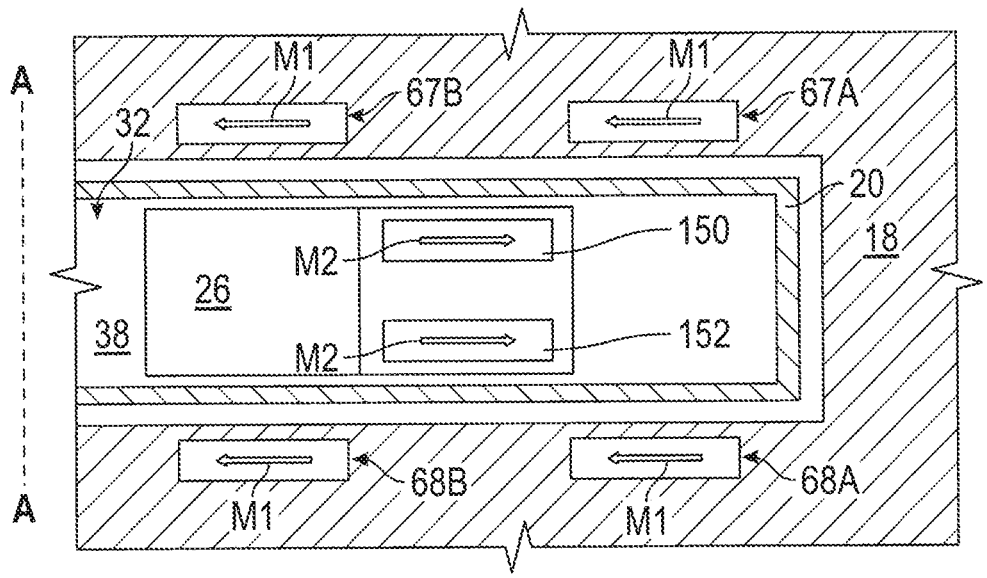
Figure 5D:
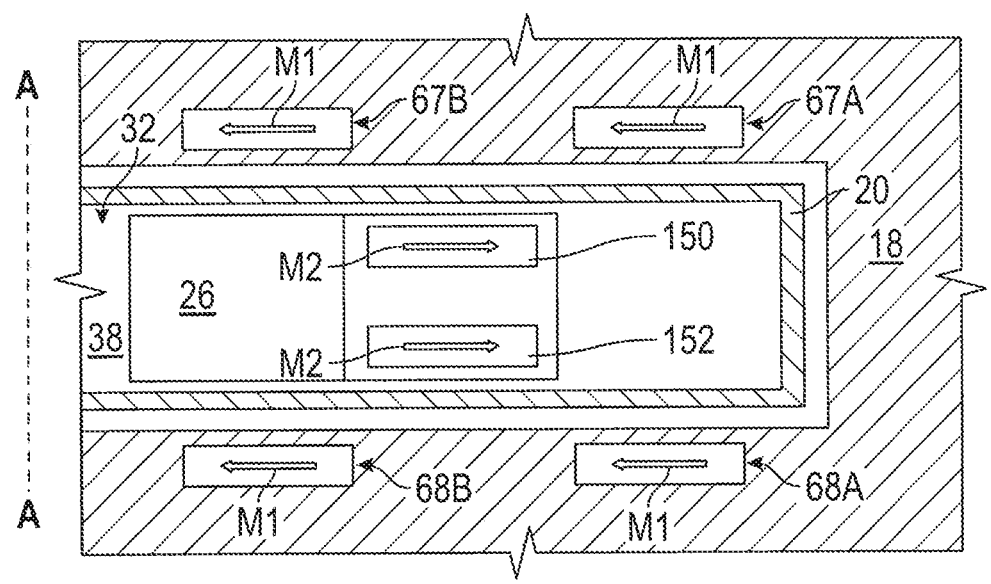
Figure 6:
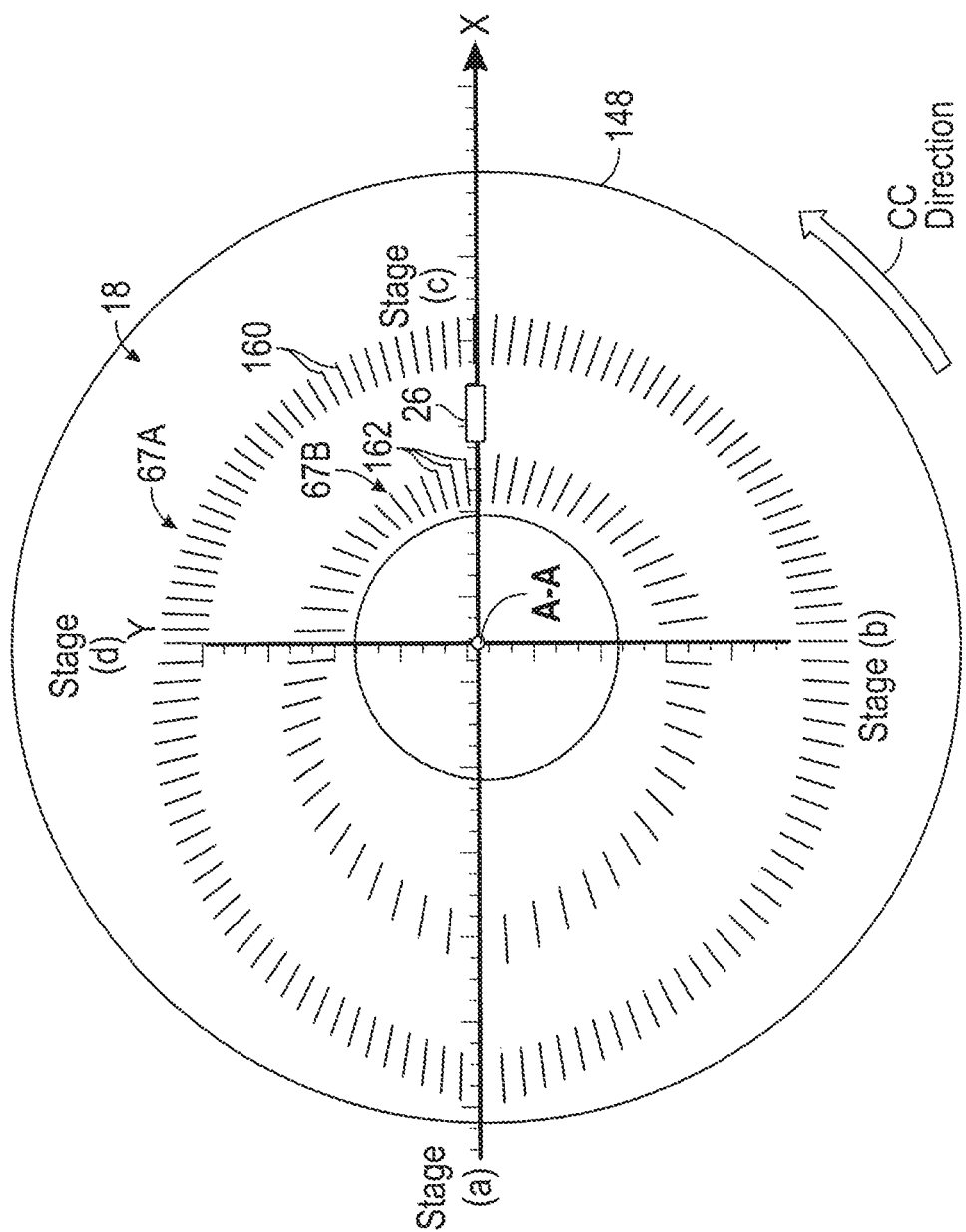
FIG. 6 is a schematic diagram of the stator shown in FIG. 1, where the stator includes magnet arrays for actuating the compression piston into the four different states of the Stirling cycle as shown in FIGS. 5A-5B.

FIG. 6 is a schematic diagram that is representative of a top view the stator 18. FIG. 6 also illustrates the magnet arrays 67A, 67B shown in FIGS. 5A-5D. As seen in FIG. 6, each magnet array 67A, 67B comprises of a series of discrete magnets 160, 162. The stator 18 defines a circumference 148, and the discrete magnets 160, 162 are arranged around a circumference 148 of the stator 18 in a first magnetic pattern. The discrete magnets 160, 162 are arranged in the first magnetic pattern and so as to interact with the magnetic elements 150, 152 of the compression piston 26 (FIGS. 3 and 4) to create the first magnetic force required to actuate the compression piston 26 within the passageway 32. More specifically, the discrete magnets 160, 162 are configured to interact with the magnetic elements 150, 152 of the compression piston 26 to position the compression piston 26 into one of the four states of the Stirling cycle.

Although magnet arrays 67A, 67B are illustrated in FIG. 6, it is to be appreciated that the magnet arrays 68A, 68B disposed along the upper surface 44 of the projection 60C (FIG. 1) are also arranged in the same magnetic pattern as well, and also include discrete magnets 160, 162 as well. The compression piston 26 is also illustrated at stage/state c. Stage c represents one of the four states of the Sterling cycle corresponding to a compression side piston. The remaining three states of the Sterling cycle are also shown as stage a, stage b, and stage d, also referred to herein as states a, b, and d, respectively. State a corresponds to FIG. 5A, state b corresponds to FIG. 5B, state c corresponds to FIG. 5C, and state d corresponds to FIG. 5D.

Continuing to refer to FIG. 6, the discrete magnets 160, 162 are arranged in the first magnetic pattern around the circumference 148 of the stator 18 and interact with the permanent magnets 150, 152 of the compression piston 26 (FIG. 4) to create the first magnetic force as the rotor 20 (FIG. 1) rotates about the axis of rotation A-A in a counterclockwise direction CC. The first magnetic force represents an amount of force required to actuate the compression piston 26 within the passageway 32 of the rotor 20. For example, in the exemplary embodiment as shown in FIGS. 5A-5D, the first magnetic force is configured to actuate the piston 26 into one of the four stages of the Stirling cycle.

Referring now to FIG. 5A, a direction of magnetization defined by the magnet arrays 67A, 67B, 68A, 68B of the stator 18 is indicated by an arrow M1, and a direction of magnetization defined by the permanent magnets 150, 152 of the rotor 20 is indicated by an arrow M2. The direction of magnetization M2 of both the permanent magnets 150, 152 of the rotor 20 are oriented in the same direction. The direction of magnetization M2 is substantially perpendicular to the axis of rotation A-A of the rotor 20. The direction of magnetization M1 of the magnet arrays 67A, 67B, 68A, 68B of the stator 18 are also oriented in the same direction as one another, where the direction of magnetization M2 of the permanent magnets 150, 152 of the compression piston 26 is opposite to the direction of magnetization M1 of the magnet arrays 67A, 67B, 68A, 68B of the stator 18. The interaction between the opposing directions of magnetization M1, M2 creates the first magnetic force.

The magnet arrays 67A, 67B are both disposed along or are proximate to the lower surface 45 of the projection 60B, and the magnet arrays 68A, 68B are disposed or are proximate to the upper surface 44 of the projection 60C. Specifically, the magnet arrays 67A, 67B are positioned within the stator 18 so as to react with the permanent magnets 150 of the compression piston 26, thereby creating a portion of the first magnetic force. Similarly, the magnet arrays 68A, 68B are positioned within the stator 18 so as to react with the permanent magnets 152 of the compression piston 26, thereby creating a remaining portion of the first magnetic force required to actuate the compression piston 26 within the passageway 32. As seen in FIG. 5A, the magnet arrays 67A and 68A are both located at equal distances from a centerline C of the compression piston 26. Similarly, the magnet arrays 68A and 68B are also located equal distances from the centerline of the compression piston 26. Accordingly, the first magnetic force along the axis of rotation A-A of the rotor 20 (seen in FIG. 1) upon the compression piston 26 created by the opposing directions of magnetization M1, M2 is substantially zero.

Referring to both FIGS. 5A and 6, the magnet arrays 67A, 67B, 68A, 68B are arranged relative to a length L of the passageway 32 such that the opposing directions of magnetization M1, M2 of the magnet arrays 65A, 65B and the permanent magnets 150, 152 orient the compression piston 26 into a first state of the Stirling cycle. As seen in FIG. 6, the first magnetic of the magnet arrays 65A, 65B changes based on a circumferential position of the compression piston 26 relative to the axis of rotation A-A of the rotor 20. More specifically, the discrete magnets 160, 162 are arranged in the first magnetic pattern around the circumference 148 of the stator 18 in order to create or induce the first magnetic force to actuate the compression piston 26 into one of the four stages of the Stirling cycle.

FIG. 5A is an illustration of the compression piston 26 at full expansion within the passageway 32. When the compression piston 26 is in the full expansion position, a minimum amount of actuation force is required to retain the compression piston 26 in place within the passageway 32. Turning now to FIGS. 5B and 6, as the rotor 20 (FIG. 1) rotates about the axis of rotation A-A in the counterclockwise direction CC from state a to state b, the discrete magnets 160, 162 of the magnet arrays 67A, 67B are arranged to decrease in distance between one another, which thereby increases the first magnetic force that is created and exerted upon the compression piston 26. As seen in FIG. 5B the compression piston 26 is urged in the passageway 32 in the first direction D1, and towards the axis of rotation A-A into stage b of the Stirling cycle. Since the compression space 38 within the passageway 32 has decreased, stage b requires more compression than stage a.

Referring now to FIGS. 5C and 6, as the rotor 20 (FIG. 1) rotates about the axis of rotation A-A in the counterclockwise direction CC from state b to state c, the discrete magnets 160, 162 of the magnet arrays 65A, 65B continue to increase in distance from one another, thereby increasing the first magnetic force exerted upon the compression piston 26. As seen in FIG. 5C, the compression piston 26 is now oriented in stage c of the Stirling cycle, which represents maximum or full compression. Accordingly, as seen in FIG. 6, the discrete magnets 160, 162 are positioned such that the distance between each discrete magnet 160, 162 is at a minimum. This is because the first magnetic force required to overcome the force exerted by the working fluid within the compression space 38 is at a maximum.

Referring now to FIGS. 5D and 6, as the rotor 20 (FIG. 1) rotates about the axis of rotation A-A in the counterclockwise direction CC from state c to state d, the discrete magnets 160, 162 of the magnet arrays 65A, 65B are arranged to stay substantially the same distance from one another. As seen in FIG. 5D, the compression piston 26 is now oriented in stage d of the Stirling cycle. Finally, as the rotor 20 rotates about the axis of rotation A-A in the counterclockwise direction CC from state d to state a, the discrete magnets 160, 162 are arranged so that the distance between each magnet 160, 162 increases and is at a maximum distance at point a. Accordingly, the first magnetic force exerted upon the compression piston 26 varies as the rotor 20 rotates about the axis of rotation A-A (FIG. 1).

Figure 7:
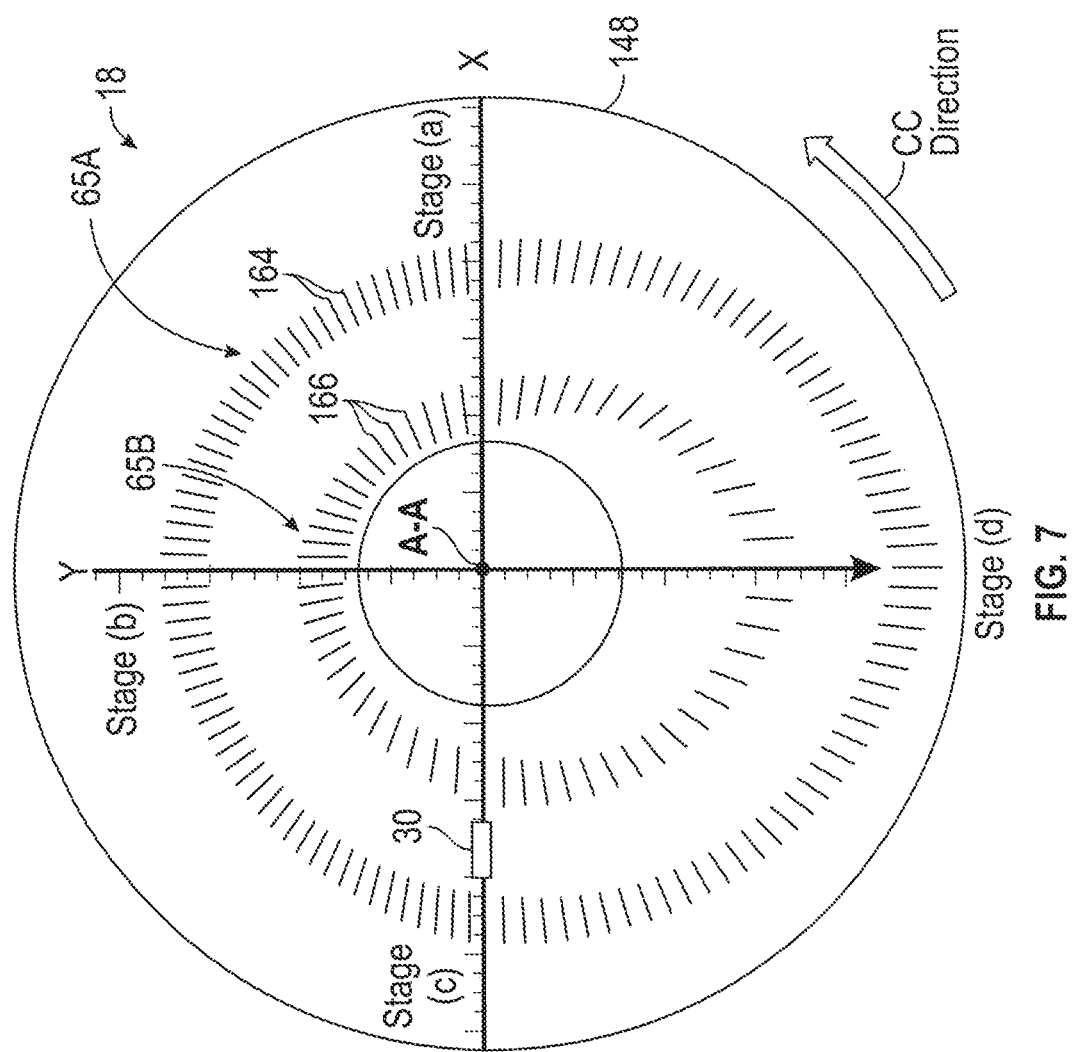
FIG. 7 is a schematic diagram of the stator shown in FIG. 1, where the stator includes magnet arrays for actuating the expansion piston shown in FIG. 1 into the four different states of the Stirling cycle.

FIG. 7 is a schematic diagram that is representative of a top view the stator 18 illustrating the magnet arrays 65A, 65B disposed along the lower surface 45 of the projection 60A (FIG. 1). The magnet arrays 65A, 65B and the magnet arrays 66A, 66B interact with the magnetic elements 150, 152 (FIG. 4) to exert a second magnetic force upon the expansion piston 30 (seen in FIG. 1). Similar to the embodiment as shown in FIG. 6, each magnet array 65A, 65B comprises of a series of discrete magnets 164, 166 that are arranged around the circumference 148 of the stator 18 in a second magnet pattern intended for actuating the expansion side piston 30. Specifically, the discrete magnets 164, 166 are arranged so as to interact with the permanent magnets 150, 152 of the piston (FIG. 4) to create the second magnetic force as the rotor 20 (FIG. 1) rotates about the axis of rotation A-A in the counterclockwise direction CC. The second magnetic force represents an amount of force required to actuate the expansion piston 30 within the passageway 34 of the rotor 20, and into one of the four stages of the Stirling cycle. Similar to the embodiment as shown in FIG. 6, the four states of the Stirling cycle are shown in FIG. 7 as stage a, stage b, stage c, and stage d. Stage a corresponds to a state of maximum compression, and stage d corresponds to a position of maximum expansion of the piston 30

Figure 8:
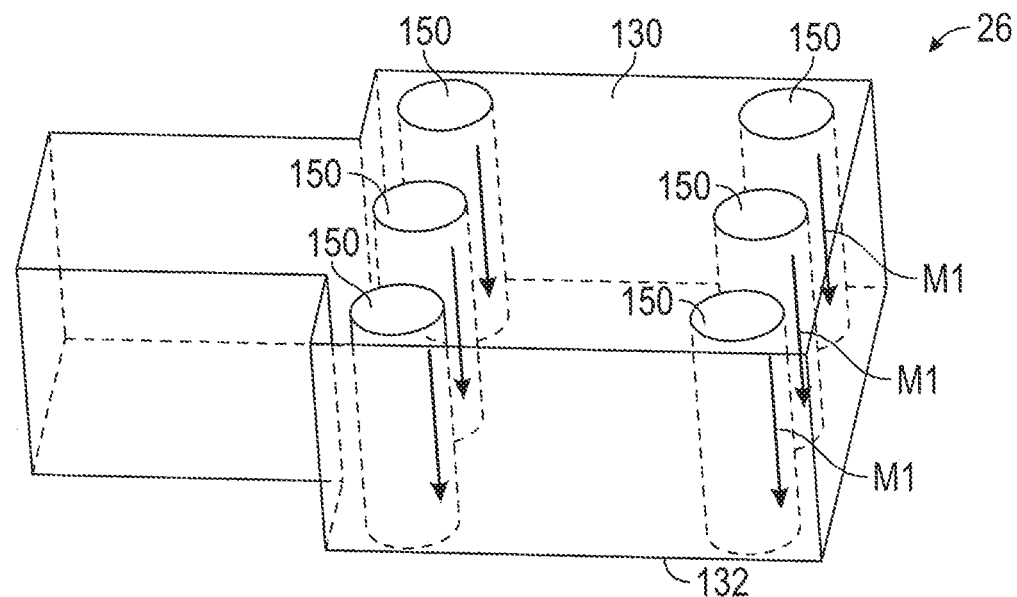
FIG. 8 is an alternative embodiment of the piston shown in FIG. 4, where the permanent magnets are aligned with the axis of rotation of the rotor shown in FIG. 1.

FIG. 8 is an alternative embodiment of the compression piston 26, where the compression piston 26 is illustrated as a transparent object. As seen in FIG. 8, the permanent magnets 150 are now oriented so that the direction of magnetization M1 of the permanent magnets 150 is oriented in a direction substantially perpendicular to the first and second directions D1 and D2 of piston travel within the rotor 20 (FIG. 2), and substantially parallel with the axis of rotation A-A (FIG. 1) of the rotor 20. Each of the permanent magnets 150 extend in a vertical direction between the first planar surface 130 and the second planar surface 132 of the compression piston 26.

Figure 9:
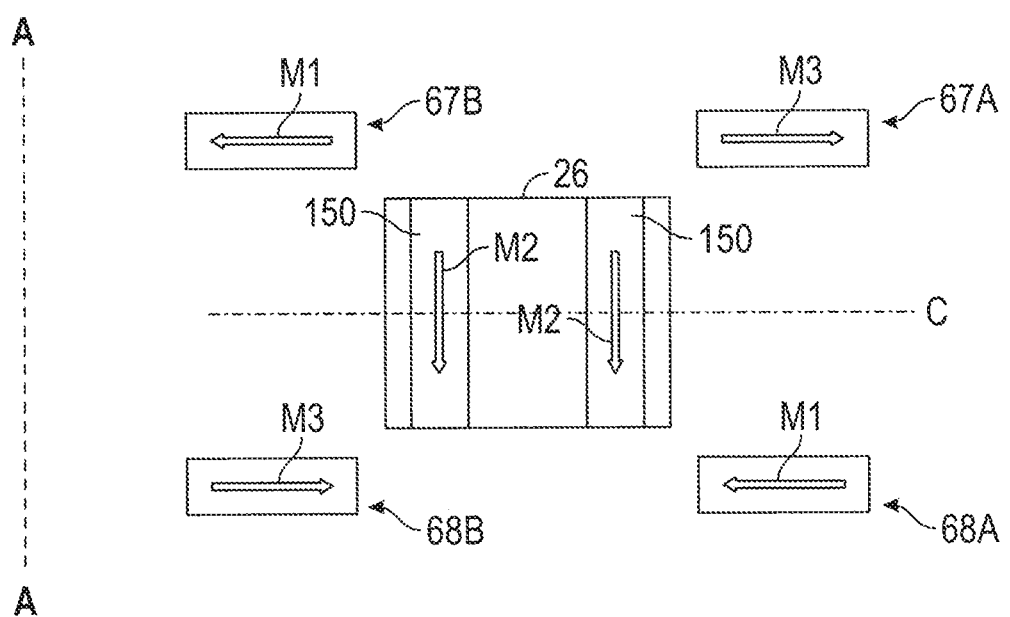
FIG. 9 is a schematic diagram illustrating an embodiment of the permanent magnets of the piston shown in FIG. 8 and the magnet arrays of the stator.

FIG. 9 is a schematic illustration of the permanent magnets 150 of the compression piston 26 relative to the magnet arrays 67A, 67B, 68A, 68B of the stator 18 (the stator 18 is not illustrated in FIG. 9). The magnet arrays 67A, 67B, 68A, 68B are oriented in a direction substantially perpendicular with respect to the axis of rotation A-A of the rotor 20 and the direction of magnetization M2 of the permanent magnets 150. Specifically, the direction of magnetization M1 of the magnet array 68B and magnet array 68A is oriented in a direction radially inward and towards the axis of rotation A-A, while the direction of magnetization M3 of the magnet arrays 67B, 68B is oriented in a direction radially outward and away from the axis of rotation A-A. The magnet arrays 67A, 67B and 68A, 68B are located at equal distances from the centerline C of the compression piston 26. Accordingly, the magnetic force exerted upon the compression piston 26 is substantially zero.

Figure 10:
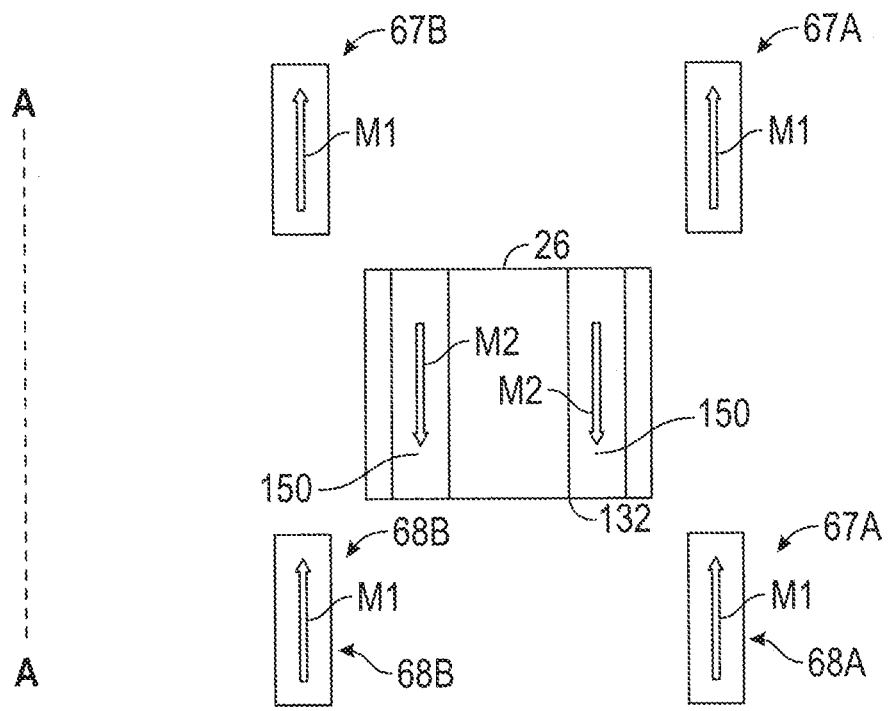
FIG. 10 is a schematic diagram illustrating an alternative embodiment of the permanent magnets of the piston and the magnet arrays of the stator shown in FIG. 9, where the permanent magnets and the magnet arrays are both substantially parallel with the axis of rotation of the rotor.

FIG. 10 is yet another embodiment of the arrangement shown in FIG. 9, where the magnet arrays 67A, 67B, 68A, 68B are now oriented substantially parallel with respect to the permanent magnets 150 of the compression piston 26 as well as the axis of rotation A-A of the rotor 20. Specifically, the direction of magnetization M2 of the permanent magnets 150 is oriented downward, and towards the second planar surface 132 of the compression piston 26. The direction of magnetization M1 for each of the magnet arrays 67A, 67B, 68A, 68B is in a direction substantially opposite the direction of magnetization M2 of the permanent magnets 150.

Figure 11:
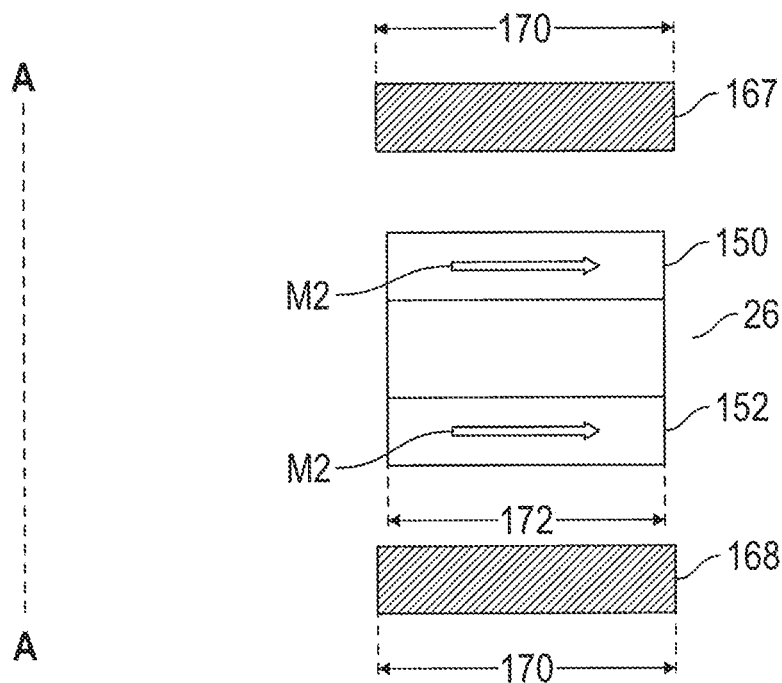
FIG. 11 is a schematic diagram illustrating another embodiment of the permanent magnets of the piston and the magnet arrays of the stator shown in FIG. 9, where the magnet array comprises a single ferromagnetic bar.

FIG. 11 is still another embodiment of the arrangement shown in FIG. 9, where the magnet arrays 67A, 67B have been replaced by a single ferromagnetic bar 167 and the magnet arrays 68A, 68B have been replaced by a single ferromagnetic bar 168. Thus, referring to both FIGS. 6 and 11, the discrete magnets 160, 162 have been replaced by ferromagnetic bars 167, 168. The ferromagnetic bars 167, 168 and the permanent magnets 150, 152 of the compression piston 26 are each oriented in a direction substantially perpendicular to the axis of rotation A-A. In the exemplary embodiment as shown in FIG. 11, both ferromagnetic bars 167, 168 define a length 170. The length 170 of the ferromagnetic bars 167, 168 is substantially identical to a length 172 of the permanent magnets 150, 152 of the compression piston 26. The direction of magnetization M2 of both magnets 150, 152 of the piston 26 is oriented in a direction outward and away from the axis of rotation A-A of the rotor 20.

Figure 12:
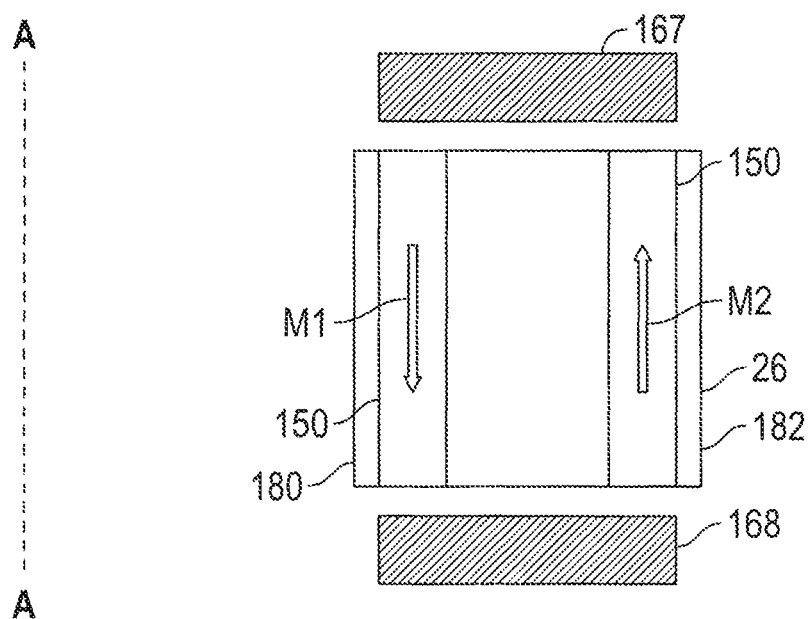
FIG. 12 is a schematic diagram illustrating still another embodiment of the permanent magnets of the piston and the ferromagnetic bars of the stator shown in FIG. 11.

FIG. 12 is another embodiment of the arrangement shown in FIG. 11, where the permanent magnets 150 are now oriented in a first direction of magnetization M1 and a second direction of magnetization M2, where both the first and second directions M1, M2 of magnetization are substantially parallel with the axis of rotation A-A. Furthermore, the direction of magnetization M1 of one or more permanent magnets 150 located at a proximate end portion 180 of the compression piston 26 closest to the axis of rotation A-A is oriented in a direction substantially opposite to the second direction of magnetization M2 of one or more permanent magnets 150 located at a distal end portion 182 of the compression piston 26 furthest away from the axis of rotation A-A.

FIG. 13 is still another embodiment of the arrangement shown in FIG. 11, where the compression piston 26 now includes a plurality of ferromagnetic bars 250, 252. Specifically, one or more ferromagnetic bars 250 are located proximate to the first planar surface 130 of the compression piston 26, and one or more ferromagnetic bars 252 are located proximate to the second planar surface 132 of the compression piston 26. The magnet arrays 67A, 67B, 68A, 68B each include a direction of magnetization M1 that is substantially perpendicular with respect to the axis of rotation A-A, and is oriented in a direction radially inward and towards the axis of rotation A-A.

In the embodiments as described above, the pistons 26, 30 are actuation in directions D1 and D2 (FIG. 2), which are substantially perpendicular to the axis of rotation A-A of the rotor 20 (FIG. 1). FIG. 14 is an alternative embodiment of the heat engine 10 where a piston 226 may be actuated in a direction substantially parallel to the axis of rotation A-A. FIG. 14 illustrates a passageway 232 that is aligned with the axis of rotation A-A of the rotor 20 (FIG. 1). The passageway 232 is oriented in a direction substantially parallel to the axis of rotation A-A. As seen in FIG. 14, the piston 226 is aligned with and extends along the axis of rotation A-A of the rotor 20. The piston 226 includes a plurality of permanent magnets 240, 242, 246 that are each aligned with the axis of rotation A-A, and are disposed along a length 254 of the piston 226. As seen in FIG. 14, the piston 226 is surrounded by two magnet arrays 266, 268. Although FIG. 14 illustrates the piston 226 as being aligned with the axis of rotation A-A of the rotor 20, in another embodiment the piston 226 may also be offset at a distance from the axis of rotation A-A of the rotor 20 as well.

Figure 15:
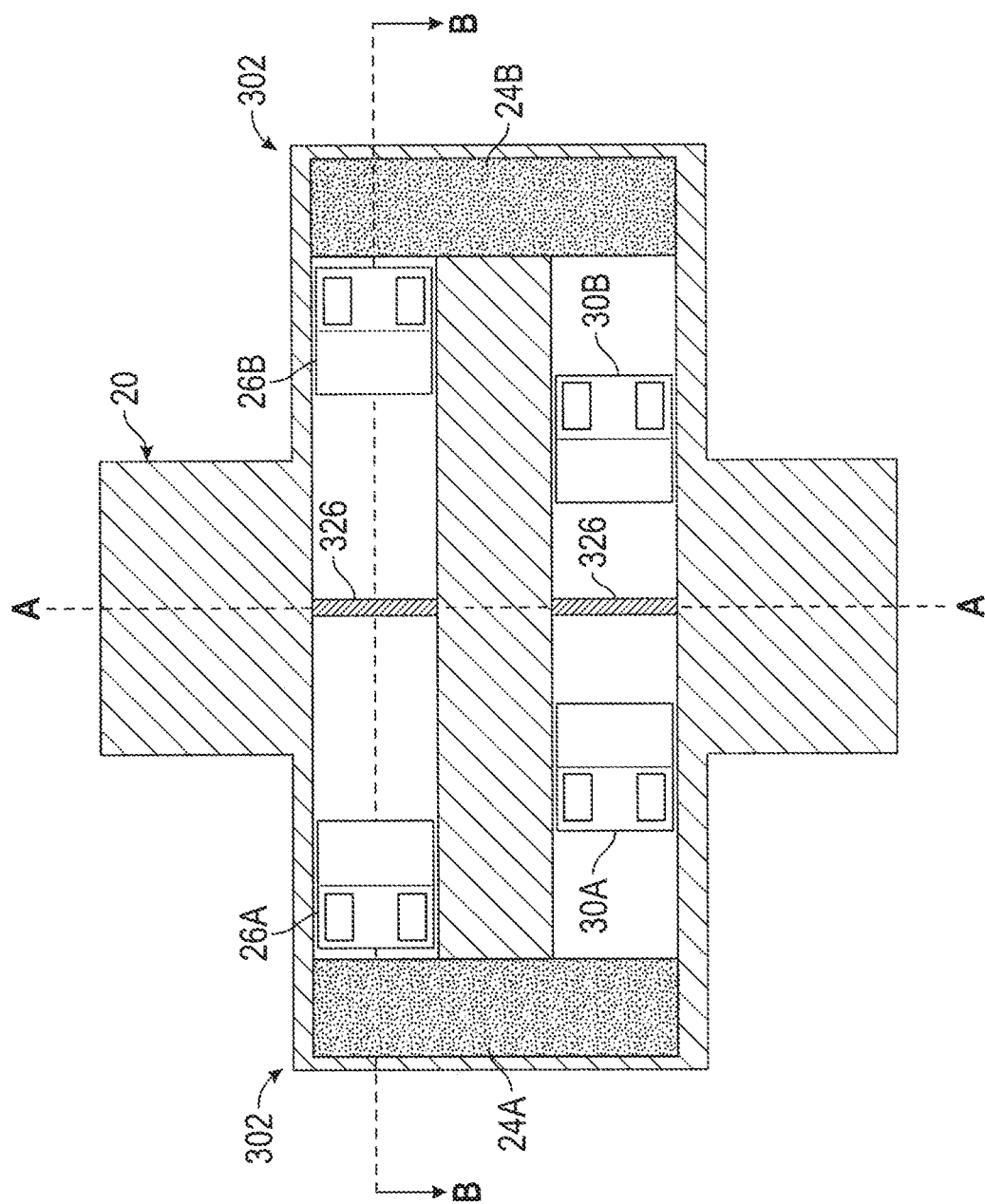
FIG. 15 is a cross-sectioned schematic view of an alternative embodiment of the rotor, taken along section line A-A of FIG. 16.
Figure 16:
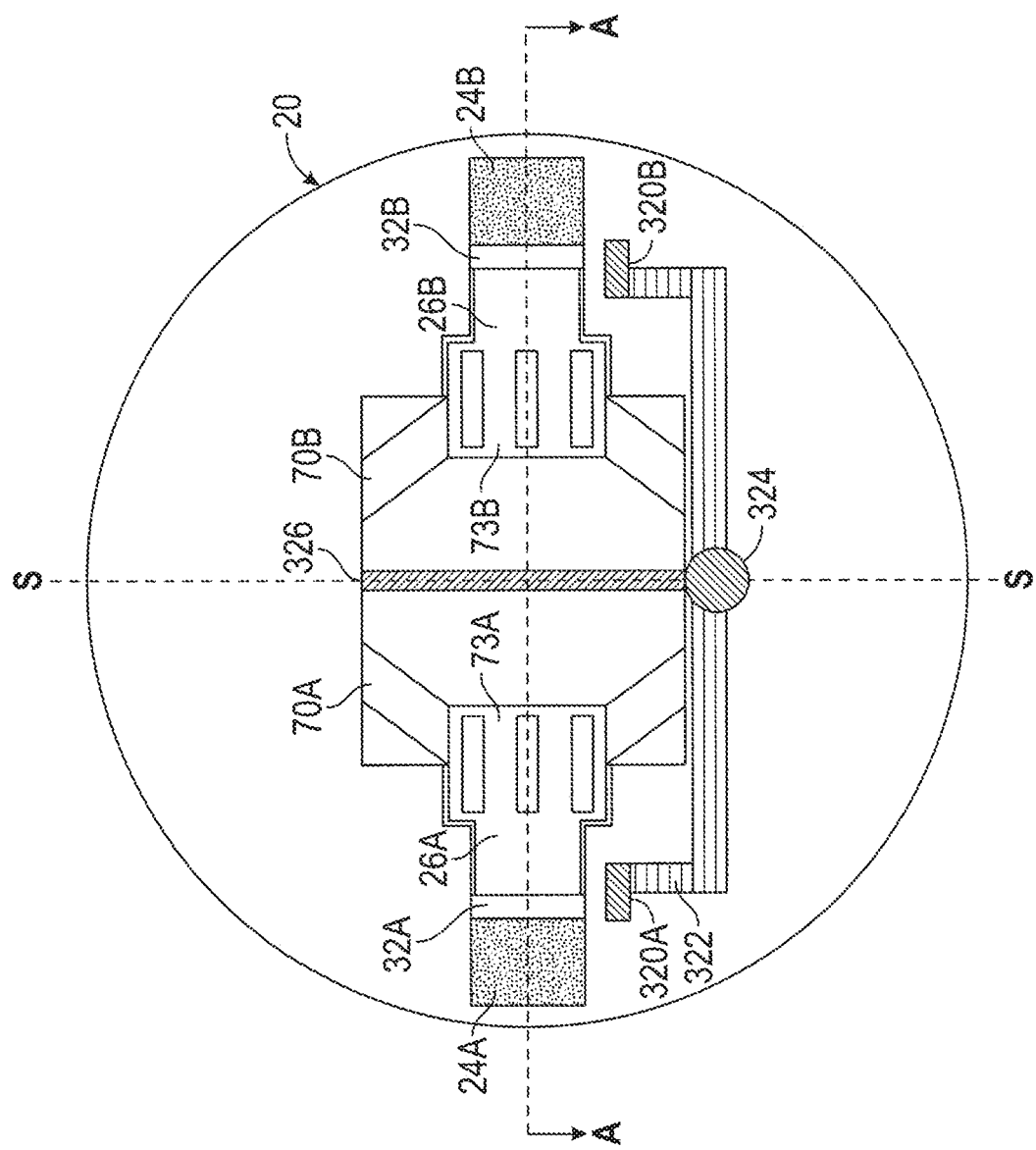
FIG. 16 is a cross-sectioned schematic view of the rotor, taken along section line B-B of FIG. 15.

FIGS. 15 and 16 are an alternative embodiment of the rotor 20, where the piston/gas arrangement seen in FIGS. 1 and 2 is reversed. FIG. 15 is a cross-sectioned schematic view of the rotor 20 taken along section line A-A of FIG. 16, while FIG. 16 is a cross-sectioned schematic view of the rotor 20 taken along section line B-B of FIG. 15. As seen in both FIGS. 15 and 16, the rotor 20 includes two regenerators 24A, 24B, two compression pistons 26A, 26B, two expansion pistons 30A, 30B. As seen in FIG. 16, the two regenerators 24A, 24B are each placed along opposing sides 302 of the rotor 20, where a first regenerator 24A is positioned on a first side 302 of the rotor 20 and a second regenerator 24B is positioned at a second side 302 of the rotor 20 that generally opposes the first side 302. The regenerator 24A is used to transfer heat between the compression piston 26A and the expansion piston 30A, and the regenerator 24B transfers heat between the compression piston 26B and the expansion piston 30B.

As seen in FIG. 16, the two compression pistons 26A, 26B are both coupled to the rotor 20 by bearings 70A, 70B. Specifically, the bearing 70A, 70B are each connected to end portions 73a, 73b of the compression piston 26A, 26B, where the end portions 73A, 73B represent the innermost portion of a respective compression piston 26A, 26B. As also seen in FIG. 16, respective heat exchangers 320A, 320B are thermally connected to a corresponding one of compression spaces 32A, 32B. Both the heat exchangers 320A, 320B are thermally connected to a thermal conduction path 322. The thermal conduction path 322 is in communication with a conduction bus 324, which is used to conduct heat along a vertical direction of the rotor 20. An optional separator 326 may be placed along an axis of symmetry S-S, and is used to separate the compression spaces 32A, 32B.

Figure 17:
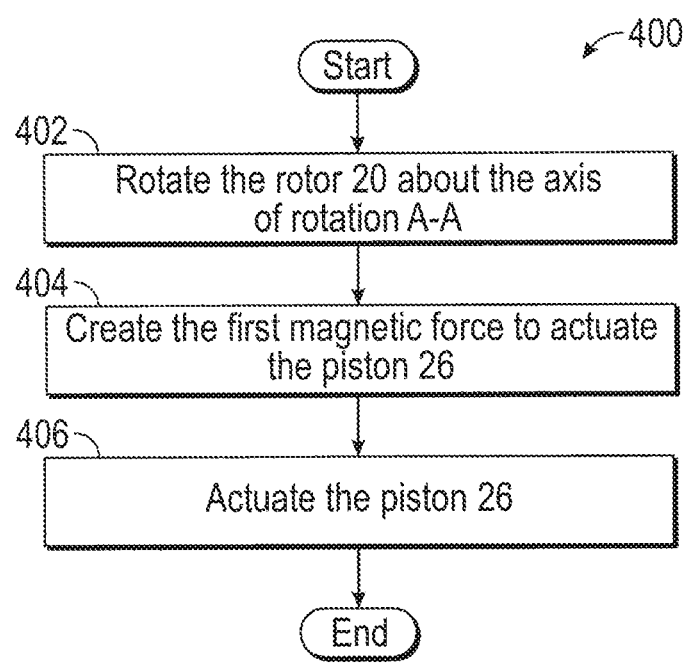
FIG. 17 is a process flow diagram illustrating an exemplary method for actuating the compression piston shown in FIG. 1.

FIG. 17 is a process flow diagram illustrating an exemplary method 400 for actuating the piston 26 shown in FIG. 1. Although only the compression piston 26 is described, it is to be appreciated that a similar approach may be used to actuate the expansion piston 30 as well.

Referring now to FIGS. 1-2, 6 and 17, method 400 may begin at block 402. In block 402, the rotor 20 is rotated about the axis of rotation A-A. As seen in FIG. 1, the rotor 20 is surrounded by the stator 18. As seen in FIG. 6, the stator 18 defines the magnet arrays 67A, 67B. The magnet arrays 67A, 67B comprise of the discrete magnets 160, 162, which are arranged around the circumference 148 of the stator 18 in the first magnetic pattern. Method 400 may then proceed to block 404.

In block 404, the first magnetic force is created as the rotor 20 rotates about the axis of rotation A-A. Specifically, as explained above, the first magnetic force is created by the interaction between the plurality of discrete magnets 160, 162 of the stator 18 and the magnetic elements 150, 152 of the piston 26. It is to be appreciated that the first magnetic force represents amount of force required to actuate the piston 26 within the passageway 32 of the rotor 20. Method 400 may then proceed to block 406.

In block 406, the first magnetic force actuates the piston 26 within the passageway 32. As seen in FIGS. 5A-5D and 6, the piston 26 may be actuated from state a to state b, state b to state c, state c to state d, or state d to state a. Method 400 may then terminate.

Referring generally to the figures, numerous technical effects and benefits are associated with the disclosed system, for utilizing magnetic force to actuate pistons. The disclosed system may be used to operate a heat engine, and eliminates the need to make contact with the rotor by a non-rotating part of the machine. Furthermore, since there is no electrical current that is directly used to actuate the pistons, there are no Joule heating losses. Employing magnets to actuate the pistons substantially eliminates most of the energy losses associated with actuating the pistons. Finally, the force exerted upon a piston at any point of operation may also be determined based on a specific size and strength of the magnetic elements included by the stator. Accordingly, the translational motion of the piston during actuation may be adjusted in order to improve operation.

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. A rotating machine (10), comprising:
   a stator (18) defining a circumference (148);
   a plurality of first magnet arrays (67A, 67B, 68A, 68B) comprised of a plurality of first discrete magnets (160, 162) arranged around the circumference (148) of the stator (18) in a first magnetic pattern;
   a rotor (20) rotatable about an axis of rotation and defining a main body (36), wherein the main body (36) defines a first passageway (32); and
   a first piston (26) including a plurality of first magnetic elements (150, 152), wherein the first piston (26) and the first passageway (32) of the rotor (20) define a piston-cylinder assembly, and wherein the plurality of first discrete magnets (160, 162) are arranged in the first magnetic pattern and are positioned to interact with the first magnetic elements (150, 152) of the first piston (26) to create a first magnetic force as the rotor (20) rotates about the axis of rotation, the first magnetic force representing a first amount of force required to actuate the first piston (26) within the first passageway (32) of the rotor (20).

2. The rotating machine (10) of claim 1, comprising a second piston (30) including a plurality of second magnetic elements (150, 152), the second piston (26) actuated within a second passageway (34) defined by the main body (36) of the rotor (20), wherein the stator (18) includes a plurality of second magnet arrays (65A, 65B, 66A, 66B) comprised of a plurality of second discrete magnets (164, 166).

3. The rotating machine (10) of claim 2, wherein the plurality of second discrete magnets (164, 166) are positioned to interact with the second magnetic elements (150, 152) of the second piston (30) to create a second magnetic force as the rotor rotates about the axis of rotation, the second magnetic force representing a second amount of force required to actuate the second piston (30) within the second passageway (34) of the rotor (20).

4. The rotating machine (10) of claim 1, wherein the plurality of first discrete magnets (160, 162) define a first direction of magnetization that is opposite to a second direction of magnetization defined by the first magnetic elements (150, 152) of the first piston (26).

5. The rotating machine (10) of claim 1, wherein the plurality of first discrete magnets (160, 162) comprise ferromagnetic bars (167, 168), and the first magnetic elements (150, 152) of the first piston (26) are permanent magnets.

6. The rotating machine (10) of claim 1, wherein the plurality of first discrete magnets (160, 162) are permanent magnets and the first magnetic elements (150, 152) of the first piston (26) are ferromagnetic bars (250, 252).

7. The rotating machine (10) of claim 1, wherein the rotating machine (10) is a Stirling engine including four stages of operation.

8. The rotating machine (10) of claim 7, wherein the first magnetic force is configured to actuate the first piston (26) into one of the four stages of operation of the Stirling engine.

9. The rotating machine (10) of claim 1, wherein the rotating machine is a cryocooler employing a Stirling cycle, the cryocooler providing cooling to a load (50).

10. The rotating machine (10) of claim 1, wherein the first piston (26) is coupled to the rotor (20) by a bearing (70).

11. The rotating machine (10) of claim 10, wherein the bearing (70) is selected from the group consisting of: a flexure bearing, a gas bearing, a slide bearing, and a linear ball bearing.

12. The rotating machine (10) of claim 1, wherein the first piston (26) is oriented within the first passageway (32) in a direction that is substantially perpendicular to the axis of rotation of the rotor (20).

13. The rotating machine (10) of claim 1, wherein the first piston (226) is actuated in a direction substantially parallel to the axis of rotation of the rotor (20).

14. The rotating machine (10) of claim 1, wherein the first magnetic elements (150, 152) define a direction of magnetization that is substantially perpendicular to the axis of rotation of the rotor (20).

15. The rotating machine (10) of claim 1, wherein the first magnetic elements (150, 152) define a direction of magnetization that is substantially parallel to the axis of rotation of the rotor (20).

16. The rotating machine (10) of claim 1, comprising a regenerator (24) positioned about the axis of rotation of the rotor (20).

17. The rotating machine (10) of claim 1, comprising a first regenerator (24A) and a second regenerator (24B), wherein the first regenerator (24A) is positioned at a first side (302) of the rotor (20) and the second regenerator (24B) is positioned at a second side (302) of the rotor (20) that opposes the first side (302).

18. A method of actuating a first piston (26) within a first passageway (32) of a rotor (20), wherein the rotor (20) is part of a rotating machine (10), the method comprising:

rotating the rotor (20) about an axis of rotation, wherein the rotor (20) is surrounded by a stator (18) that defines a circumference (148), and wherein a plurality of first magnet arrays (67A, 67B, 68A, 68B) are comprised of a plurality of first discrete magnets (160, 162) arranged around the circumference (148) of the stator (18) in a first magnetic pattern;

creating a first magnetic force as the rotor (20) rotates about the axis of rotation, wherein the first magnetic force is created by an interaction between the plurality of first discrete magnets (160, 162) arranged around the circumference (148) of the stator (18) and a plurality of first magnetic elements (150, 152) of the first piston (26); and actuating the first piston (26) within the first passageway (32) of the rotor (20) by the first magnetic force, wherein the first piston (26) and the first passageway (32) of the rotor (20) define a piston-cylinder assembly.

19. The method of claim 18, further comprising creating a second magnetic force as the rotor (20) rotates about the axis of rotation, wherein the second magnetic force represents a second amount of force required to actuate a second piston (30) within a second passageway (34) of the rotor (20).

20. The method of claim 18, comprising actuating the first piston (26) into one of four stages of a Stirling cycle.

\* \* \* \* \*